(12) United States Patent
Sarajlic et al.

(10) Patent No.: US 12,323,281 B2
(45) Date of Patent: *Jun. 3, 2025

(54) COMMUNICATION OF INFORMATION USING GUARD BAND OF A COMMUNICATION CHANNEL

(71) Applicant: Telefonaktiebolaget LM Ericsson (publ), Stockholm (SE)

(72) Inventors: Muris Sarajlic, Malmö (SE); Joao Vieira, Hjärup (SE); Jung-Fu Cheng, Fremont, CA (US); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,752

(22) Filed: Jan. 30, 2024

(65) Prior Publication Data
US 2024/0171434 A1    May 23, 2024

Related U.S. Application Data

(63) Continuation of application No. 17/475,991, filed on Sep. 15, 2021, now Pat. No. 11,924,011.

(51) Int. Cl.
*H04L 5/00*  (2006.01)
*H04L 1/00*  (2006.01)
(Continued)

(52) U.S. Cl.
CPC ........ *H04L 27/2607* (2013.01); *H04L 1/0003* (2013.01); *H04W 72/0453* (2013.01); *H04W 72/1263* (2013.01)

(58) Field of Classification Search
CPC ....... H04L 5/0048; H04L 1/00; H04L 1/0025; H04L 1/0046; H04L 1/0072; H04L 1/1896; H04L 25/03898; H04L 27/0008
See application file for complete search history.

(56) References Cited

U.S. PATENT DOCUMENTS 8,428,043 B2 *  4/2013  Kishiyama .......... H04L 27/2647
                                                     370/535
8,606,280 B2    12/2013  Lee et al.
(Continued)

FOREIGN PATENT DOCUMENTS

WO   2017135885 A1   8/2017
WO   2017204735 A1   11/2017

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1 V17.0.0, Dec. 2020, 488 pages.
(Continued)

*Primary Examiner* — Phuc H Tran
(74) *Attorney, Agent, or Firm* — Murphy, Bilak & Homiller, PLLC

(57) ABSTRACT

Embodiments of the present disclosure provide a method, a transmitter node, a receiver node, and a computer program product for communication of information in a communication channel comprising at least one main band and an adjacent guard band. The method is performed by a transmitter node in a wireless communication network. The
(Continued)

method comprises determining whether to transmit information in the guard band based one or more configured transmission parameters associated with the transmitter node. Upon determination to transmit information in the guard band, the method comprises determining transmission power for frequency resources allocated in the guard band based on a spectral mask defining a power density limit across an allocated frequency range. The method further comprises transmitting first information on the frequency resources allocated in the guard band and second information on frequency resources allocated in the main band to a receiver node according to the determined transmission power. Corresponding transmitter node, receiver node and computer program products are also disclosed.

27 Claims, 9 Drawing Sheets

(51) Int. Cl.
  *H04L 27/26* (2006.01)
  *H04W 72/0453* (2023.01)
  *H04W 72/1263* (2023.01)

(56) References Cited

U.S. PATENT DOCUMENTS

| | | | |
|---|---|---|---|
| 8,665,695 B2* | 3/2014 | Liao | H04L 27/2647 370/344 |
| 9,071,399 B2* | 6/2015 | Drewes | H04L 5/0044 |
| 10,694,393 B2 | 6/2020 | Baldemair et al. | |
| 2012/0263047 A1 | 10/2012 | Love et al. | |
| 2018/0048436 A1 | 2/2018 | Park et al. | |
| 2018/0048511 A1 | 2/2018 | Hakola et al. | |

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2 V17.0.0, Dec. 2020, 180 pages.

"Part 11: Wireless LAN Medium Access Control (MAC) and Physical Layer (PHY) Specifications. Amendment 3: Enhancements for Very High Throughput in the 60 GHz Band", IEEE Computer Society, IEEE Std 802.11ad™-2012, IEEE, 3 Park Avenue, New York, NY, USA, Dec. 28, 2012, 628 pages.

\* cited by examiner

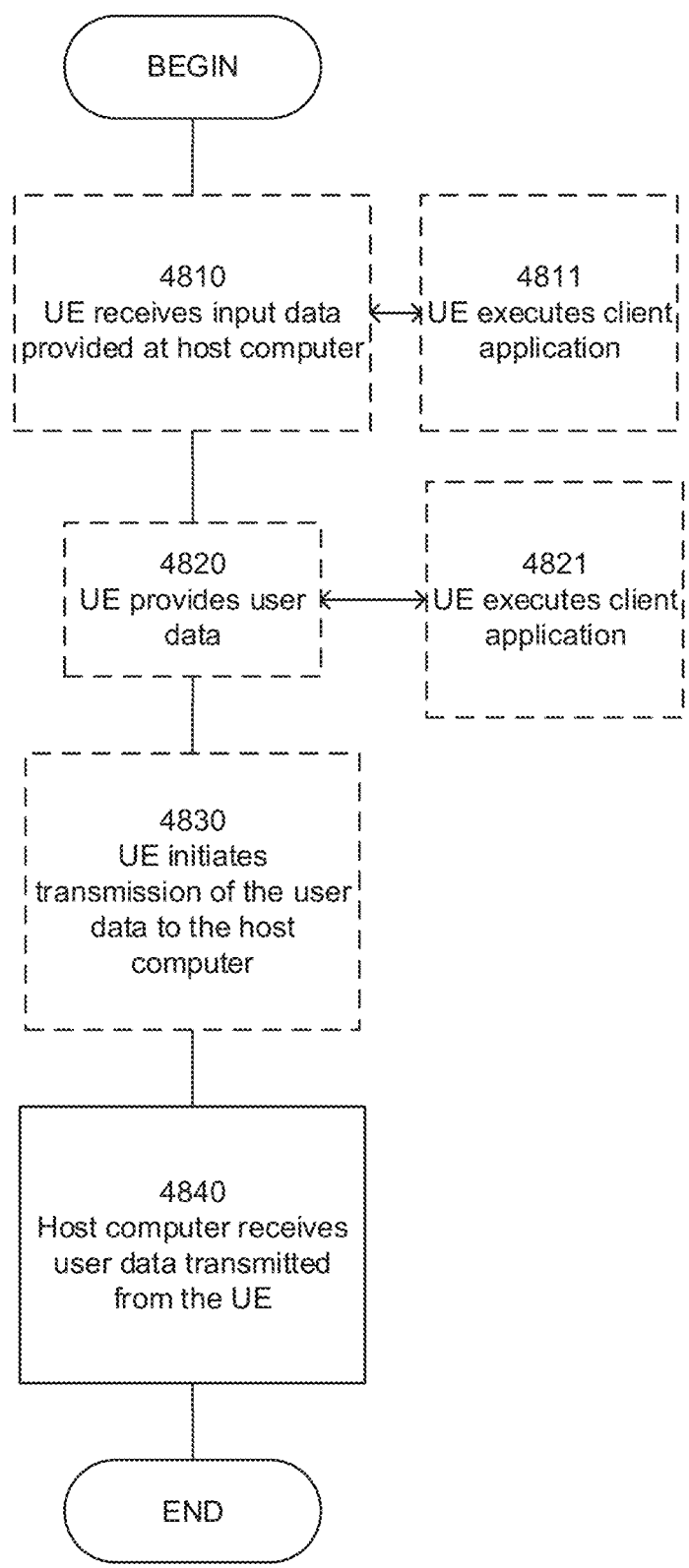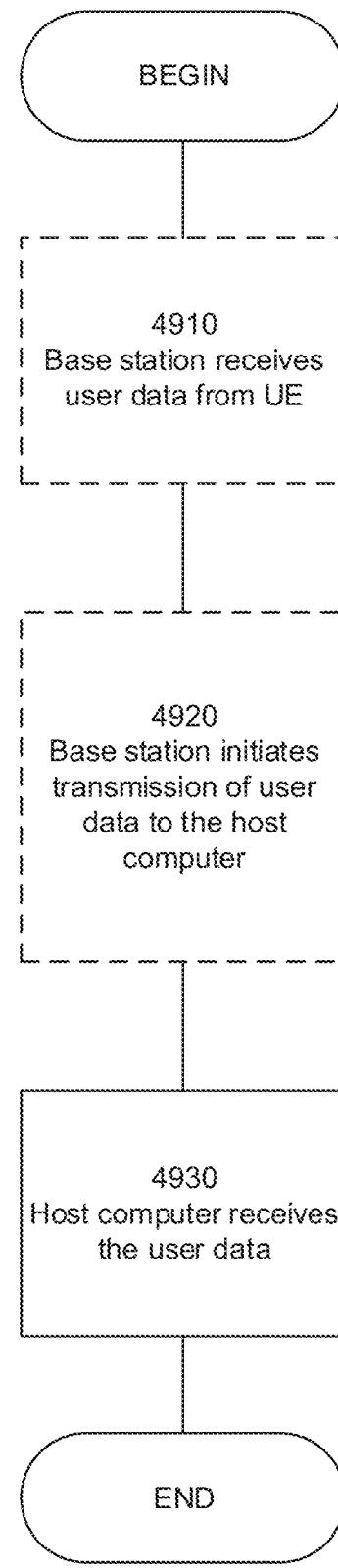
FIG. 14
FIG. 15

COMMUNICATION OF INFORMATION USING GUARD BAND OF A COMMUNICATION CHANNEL

RELATED APPLICATIONS

This application is a continuation of U.S. application Ser. No. 17/475,991 filed 15 Sep. 2021. The contents of the aforementioned application is incorporated herein by reference.

TECHNICAL FIELD

The present disclosure relates generally to the field of wireless communication. More particularly, it relates to methods, transmitter node, receiver node and computer program products for communication of information using a guard band of a communication channel.

BACKGROUND

In general, a wireless communication system defines guard bands to avoid mutual interference between channels or frequency assignments, FAs. For example, in an Orthogonal Frequency Division Multiplexing, OFDM-based system, the guard band is used to eliminate the interference between the channels.

Referring to FIG. 1, a communication channel comprises a total channel bandwidth, also referred to as nominal channel band 101, which comprises a main band 103, a scheduled band 106 and at least one guard band 108. In FIG. 1 the main band 103 is flanked by one guard band 108 on each side. The nominal channel band 101 is typically wider than the maximum configured transmission bandwidth 110. A spectral mask defining limitations on spectral emissions is illustrated with dashed lines. The spectral mask provides maximum values of transmit power at given frequencies.

SUMMARY

In wireless systems and especially in new radio, NR, systems, frequency resources are allocated for transmission of information only inside the main band and there are no frequency resources allocated for transmission of information inside the guard bands. Thus, the guard band is not exploited for data transmission, which results in loss of spectral efficiency.

Consequently, there is a need for an improved method and apparatus for communication of information using the guard band that alleviates at least some of the above cited problems.

It is therefore an object of the present disclosure to provide a method, a transmitter node, a receiver node and a computer program product for communication of information using guard band of a communication channel to mitigate, alleviate, or eliminate all or at least some of the above-discussed drawbacks of presently known solutions.

This and other objects are achieved by means of a method, a transmitter node, a receiver node and a computer program product as defined in the appended claims. The term exemplary is in the present context to be understood as serving as an instance, example or illustration.

According to a first aspect of the present disclosure, a method for communication of information in a communication channel comprising at least one main band and an adjacent guard band is disclosed. The method is performed by a transmitter node in a wireless communication network. The method comprises determining to transmit information in the guard band based on one or more configured transmission parameters associated with the transmitter node. Upon determination to transmit information in the guard band, the method comprises determining transmission power for frequency resources allocated in the guard band based on a spectral mask defining a power density limit across an allocated frequency range of the communication channel. The method further comprises transmitting first information on the frequency resources allocated in the guard band and second information on frequency resources allocated in the main band to a receiver node according to the determined transmission power.

In some embodiments, the method further comprises selecting one or more first modulation and coding schemes, MCSs, to be used for transmission of the first information in the guard band and selecting one or more second MCS to be used for transmission of the second information in the main band.

In some embodiments, a selected first MCS to be used for the transmission of the first information on the frequency resources in the guard band is identical to a selected second MCS used for the transmission of the second information on the frequency resources in the main band.

In some embodiments, a selected first MCS to be used for the transmission of the first information on the frequency resources in the guard band is different from a selected second MCS to be used for the transmission of the second information on the frequency resources in the main band.

In some embodiments, the method further comprises transmitting an indication of the selected one or more first MCSs used for the transmission of the first information on the frequency resources in the guard band and selected one or more second MCSs used for the transmission of the second information on the frequency resources in the main band to the receiver node.

In some embodiments, the step of transmitting the indication of the selected one or more first and second MCSs used for the first information and the second information comprises transmitting, to the receiver node, a MCS mapping table comprising a mapping between the selected one or more first MCSs used for transmissions in the guard band to the selected one or more second MCSs used for transmissions in the main band.

In some embodiments, the step of determining whether to transmit information in the guard band based on one or more configured transmission parameters comprises obtaining the one or more configured transmission parameters comprising one or more of: scheduled bandwidth of the communication channel, maximum configurable bandwidth of the communication channel, scheduling information of the frequency resources in the guard band, scheduling information of the frequency resources in the main band, configured transmit power, frequency band and the spectral mask.

The method comprises determining to transmit information in the guard band at least based on the maximum configurable bandwidth, scheduled bandwidth of the communication channel and the spectral mask. For example, it may be determined to transmit information in the guard band if the scheduled bandwidth is smaller than the maximum configurable bandwidth but larger than the bandwidth of the main band (bandwidth of the flat part of the spectral mask).

In some embodiments, the step of determining the transmission power for the frequency resources allocated in the guard band comprises setting a power spectral density, PSD, for the frequency resources in the guard band, wherein the PSD of the frequency resources in the guard band is a fraction of a value defined by the spectral mask in the guard band and set below the spectral mask in the guard band.

In some embodiments, the step of determining transmission power for resources allocated in the guard comprises segmenting the guard band into a plurality of sub-bands and determining a PSD in each sub-band, wherein the PSD in each sub-band is set below the spectral mask in the guard band.

In some embodiments, the first information assigned on the frequency resources of the guard band is different from the second information assigned on the frequency resources of the main band.

In some embodiments, the first information assigned on the frequency resources in the guard band is a repetition of a subset of the second information assigned on the frequency resources in the main band.

In some embodiments, the method further comprises determining a repetition pattern defining a pattern comprising a mapping between the frequency resources in the guard band and the frequency resources in the main band, the information transmitted on the frequency resources in the main band being repeated at least in part on the frequency resources in the guard band. The method comprising transmitting an indication of the repetition pattern to the receiver node.

In some embodiments, the first information and the second information represent one or more of: control information and user information.

According to a second aspect of the present disclosure, a method for reception of information in a communication channel is provided. The communication channel comprises at least one main band and an adjacent guard band. The method is performed by a receiver node, in a wireless communication network. The method comprises receiving first information on frequency resources allocated in the guard band and second information on frequency resources allocated in the main band from a transmitter node. Further, the method comprises decoding the received first information and the second information using one or more selected first and second modulation and coding schemes, MCSs, indicated by the transmitter node.

In some embodiments, the step of decoding the received first information and the received second information using the one or more selected first and second MCSs indicated by the transmitter node comprises receiving an indication about the one or more selected first MCSs used for transmitting the first information on the frequency resources in the guard band and the one or more selected second MCSs used for transmitting the second information on the frequency resources in the main band from the transmitter node.

In some embodiments, the first information assigned on the frequency resources of the guard band is different from the second information on the frequency resources of the main band.

In some embodiments, the first information assigned on the frequency resources of the guard band is a repetition of a subset of the second information assigned on the frequency resources in the main band.

In some embodiments, the method further comprises receiving an indication of a repetition pattern defining a pattern comprising a mapping between the frequency resources in the guard band and the frequency resources in the main band, the information transmitted on the frequency resources in the main band being repeated at least in part on the frequency resources in the guard band. The method comprises decoding the frequency resources in the guard band and the frequency resources in the main band based on the indicated repetition pattern.

In some embodiments, the first information and the second information represent one or more of: control information and user information.

According to a third aspect of the present disclosure, an apparatus of a transmitter node configured to operate in a wireless communication network for communication of information in a communication channel is provided. The communication channel comprises at least one main band and an adjacent band. The apparatus comprising a controlling circuitry configured to cause determination of whether to transmit information in the guard band based on one or more configured transmission parameters associated with the transmitter node. Upon the determination to transmit information in the guard band, the controlling circuitry is configured to cause determination of a transmission power for frequency resources allocated in the guard band based on a spectral mask defining a power density limit across an allocated frequency range of the communication channel. Further, the controlling circuitry is configured to cause transmitting of first information on the frequency resources allocated in the guard band and second information on frequency resources allocated in the main band to a receiver node according to the determined transmission power.

A fourth aspect is a transmitter node comprising the apparatus of the third aspect.

According to a fifth aspect of the present disclosure, an apparatus for a receiver node configured to operate in a wireless communication network for reception of information in a communication channel is provided. The communication channel comprises at least one main band and an adjacent guard band. The apparatus comprising a controlling circuitry being configured to cause reception of first information on frequency resources allocated in the guard band and second information on frequency resources allocated in the main band from a transmitter node. Further, the controlling circuitry is configured to cause decoding of the received first information and the second information using one or more selected first and second modulation and coding schemes, MCSs, indicated by the transmitter node.

A fifth aspect is a receiver node comprising the apparatus of the fourth aspect.

According to a sixth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

In some embodiments, any of the above aspects may additionally have features identical with or corresponding to any of the various features as explained above for any of the other aspects.

An advantage of some embodiments is that alternative and/or improved approaches are provided for communication of information using the guard band of a communication channel.

An advantage of some embodiments is that the usage of the guard band for communication of information may improve the throughput and spectrum utilization.

An advantage of some embodiments is that the demodulation reference signals may be transmitted using the guard band and when the demodulation reference signals are allocated to the guard band, no additional signaling is required for amplitude demodulation of signals in the guard band.

An advantage of some embodiments is that the same modulation and coding scheme may be used across the main band and the guard band when the guard band is used for communication of information.

An advantage of some embodiments is that by repeating some of the information transmitted in the main band in the guard band, a more robust transmission is enabled.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 14 is a block diagram of methods implemented in a communication system including a host computer, a base station, and a UE, according to some embodiments; and FIG. 15 is a block diagram of methods implemented in a communication system including a host computer, a base station, and a UE, according to some embodiments.

DETAILED DESCRIPTION

Figure 1:
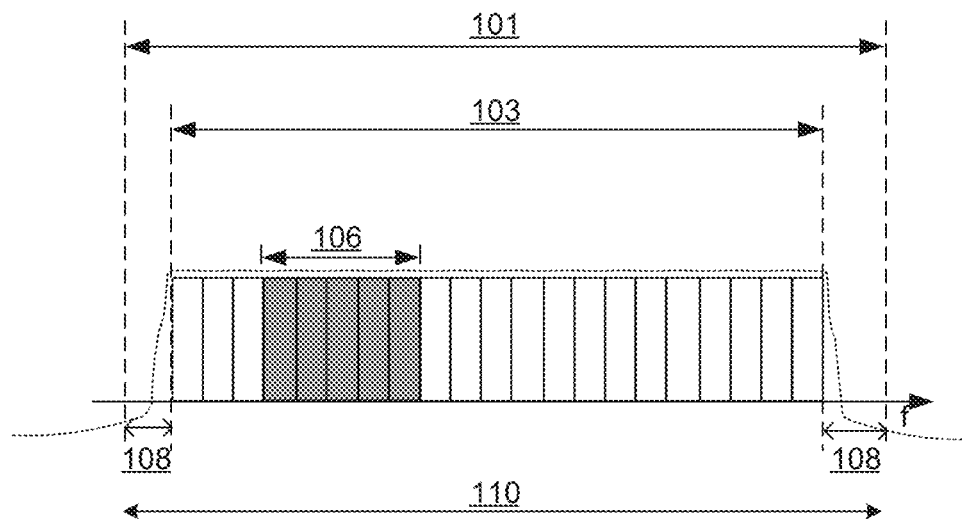
FIG. 1 discloses an example communication channel.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, receiver nodes, also known as mobile terminals, user equipment (UE) and/or wireless terminals, are enabled to communicate wirelessly with a transmitter node in a wireless communication network.

Typically, a transmitter node may be a network node that serves or covers one or several cells of the wireless communication network. That is, the network node provides radio coverage in the cell(s) and communicates over an air interface with the UE(s) operating on radio frequencies within its range. The network node may be also referred to as "eNB", "eNodeB", "NodeB" or "gNB", depending on the technology and terminology used. In the present disclosure, the network node device may also be referred to as a base station, BS.

In the present disclosure, it is assumed that connection establishment has already been completed between the receiver node(s) and the transmitter node.

In the following description of exemplary embodiments, the same reference numerals denote the same or similar components.

Figure 2:
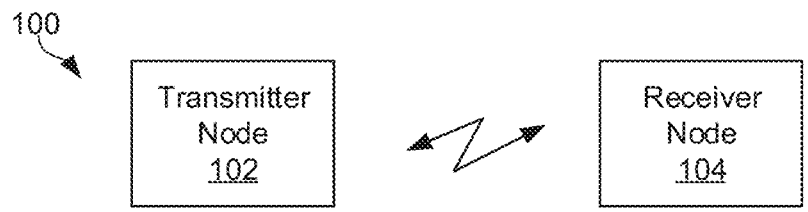
FIG. 2 is an example wireless communication network according to some embodiments.

FIG. 2 discloses an example communication network in the form of a wireless communication network 100. As depicted in FIG. 2, the wireless communication network 100 includes a transmitter node 102 and a receiver node 104.

For downlink transmission, the transmitter node 102 may be a base station, and the receiver node 104 may be a wireless device or a remote station. For uplink transmission, the transmitter node 102 may be a wireless device, and the receiver node 104 may be a base station. The base station is generally a fixed station that communicates with the wireless devices and may also be referred to as new radio, NR, base station i.e., a gNB or a Node B, an evolved Node B (eNode B), an access point, etc. The wireless device may be stationary or mobile and may also be referred to as a remote station, a mobile station, user equipment, mobile equipment, a terminal, a remote terminal, an access terminal, a station, etc. The wireless device may be a cellular phone, a personal digital assistant (PDA), a wireless modem, a wireless communication device, a handheld device, a subscriber unit, a laptop computer, etc., The receiver node 104 communicates with the transmitter node 102 serving the receiver node 104. Thus, the receiver node 104 involves in bidirectional radio communication with the transmitter node 102.

Although not shown in FIG. 2, there may be a plurality of receiver nodes 104a-104n in the coverage of the transmitter node 102. The transmitter node 102 comprises a scheduler for dynamically scheduling downlink transmissions and allocating uplink transmission resources for the receiver node 104 communicating with the transmitter node 102 as shown in FIG. 2.

To facilitate communications, different communication channels are established between the transmitter node 102 and the receiver node 104. When the transmitter node 102 has information to be transmitted to the receiver node 104, the transmitter node transmits the information using frequency resources configured in the communication channel. For example, the transmitter node 102 typically utilizes a main band in the communication channel for transmitting the information to the receiver node.

In wireless systems and especially in new radio, NR, systems, frequency resources are allocated for transmission of information only inside the main band, and there are no frequency resources allocated for transmission of information inside the guard bands (compare with FIG. 1). Thus, the guard band is not exploited for data transmission. This is typically the case since the guard bands are meant to reduce interference between channels. However, since in e.g. NR, high demands are put on connectivity, latency and throughput, valuable resources may be wasted on the guard band.

A useful metric for describing and quantifying the problems with the above concept is spectrum utilization (SU), defined as $$SU = \text{bandwidth(maximum transmission band)/bandwidth(nominal band)}$$

In other words, the SU quantifies how much of the nominal bandwidth can be used for data transmission (and consequently, how much is wasted on guard bands).

In LTE and NR, a rather high rate of spectrum utilization is achieved, and this rate increases, in general, with nominal bandwidth and operating frequency. For example, SU=93.35% for NB=20 MHz, 60 kHz subcarrier spacing (SCS) and Frequency range 1, FR1, operation and SU=97.54% for NB=400 MHZ, 120 kHz SCS and Frequency range 2, FR2, operation.

The issue of which spectral mask being used for operation at frequencies beyond 52.6 GHz is still a matter of active standardization efforts in 3GPP. Factors such as operation in unlicensed bands may influence a choice of spectral mask with a significantly lower SU than FR1 and FR2 masks. It may e.g. be that the flat part of the mask (i.e. the part of the mask which coincides with BW used for data transmission), has a bandwidth of 1.88 GHz and nominal channel bandwidth is 2.16 GHz, yielding SU=87.04%.

In such case, the scheduled band width is actually larger than the flat part of the mask, but the part of the band that lies outside of the flat part of the mask is treated as guard band.

Therefore, according to some embodiments of the present disclosure, the transmitter node 102 implements a method for efficiently utilizing the guard band for communication of information to the receiver node 104 as described herein. Furthermore, the receiver node 104 may implement a method for reception of the information in the guard band from the transmitter node 104.

In at least some implementations, the guard band may be leveraged to transmit wireless broadband data, such as data transmission in a wireless local area network, WLAN. The data transmission, for example, can be performed according to the 802.11 Standards for wireless data communication managed by the Institute of Electrical and Electronics Engineers IEEE. The 802.11 Standards are often referred to as "Wi-Fi". Also, the embodiments described herein may be applicable to various cellular communication systems such as LTE, NR or the like.

According to some embodiments of the present disclosure, the transmitter node 102 determines to transmit information in the guard band based on one or more configured transmission parameters associated with the transmitter node. For example, the configured transmission parameters may comprise one or more of scheduled bandwidth of the communication channel, maximum configurable bandwidth of the communication channel, scheduling information of the frequency resources in the guard band, scheduling information of the frequency resources in the main band, configured transmit power, frequency band and the spectral mask. Some configured transmission parameters may be pre-defined as property of the used communication standard or equipment whereas some transmission parameters may be determined on the basis of expected throughput, available bandwidth, number of users in the system, etc. The spectral mask may e.g. be obtained as a pre-determined spectral mask. It may be chosen from a set of available (pre-determined) spectrum masks. It may in some embodiments be dynamically set based on available communication resources and network conditions.

For example, it may be determined to transmit information in the guard band if the scheduled bandwidth is smaller than the maximum configurable bandwidth but larger than the bandwidth of the main band (bandwidth of the flat part of the spectral mask)

Figure 3:
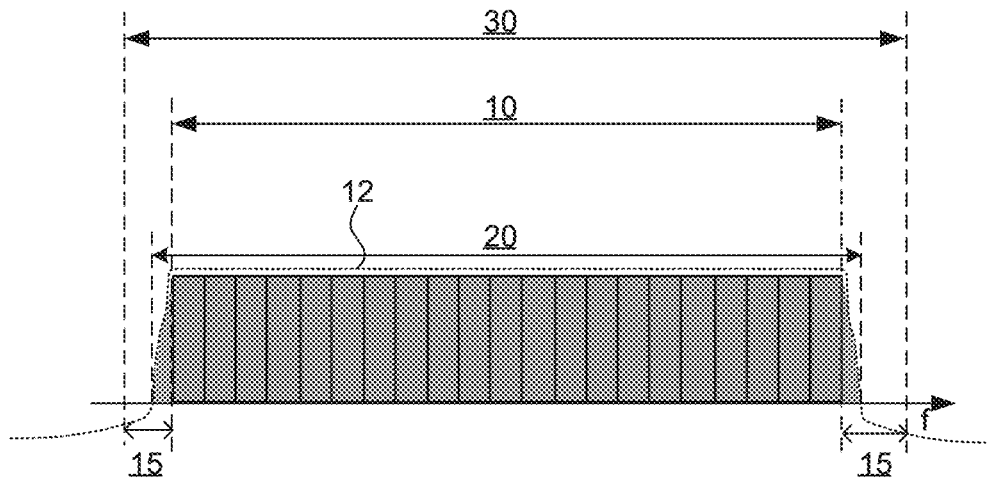
FIG. 3 is an example communication channel according to some embodiments.

In some embodiments, as shown in FIG. 3, the transmitter node 102 may determine to transmit information in the guard band 15 based on bandwidth of the scheduled band 20, maximum configurable bandwidth 30 and bandwidth of the main band 10. For example, bandwidth of the main band 10 may be 1 GHz whereas the bandwidth of the scheduled band 30 may be 1.1 GHz, maximum configurable bandwidth may be 1.15 GHz and bandwidth (BW) of the nominal band 30 may be 1.2 GHz. Applying the embodiments described herein, 100 MHz of guard band (out of 150 MHz that is available for use) may be used for transmission of data, since the scheduled bandwidth 20 is larger than the bandwidth of the main band 10 and smaller than the maximum configurable bandwidth 30.

When the transmitter node 102 determines to transmit the information in the guard band, the transmitter node may determine transmission power for the frequency resources allocated in the guard band based on the spectral mask defining a power density limit across an allocated frequency range of the communication channel. For example, the determined transmission power for the frequency resources allocated in the guard band may be shaped such that the power spectral density, PSD of the transmission is set just below the PSD defined by the spectral mask in the guard band. This is illustrated in e.g. FIG. 3, where frequency resources used for transmission of data are illustrated as being grey and conforming to the spectral mask, both the flat part of the mask and the sloped parts of the mask. For a given transmission, the spectral mask can be chosen from a plurality of pre-defined spectral masks, or otherwise formulated, based on some transmission parameters. For example, the spectral mask can be chosen based on the configured transmit power and frequency band.

Further, the transmitter node 102 transmits first information on the frequency resources allocated in the guard band and second information on frequency resources allocated in the main band according to the determined transmission power. Various embodiments for transmission of information on the frequency resources allocated in the guard band and selection of one or more modulation and coding schemes for the transmission of the information are explained in later parts of the description.

Figure 4:
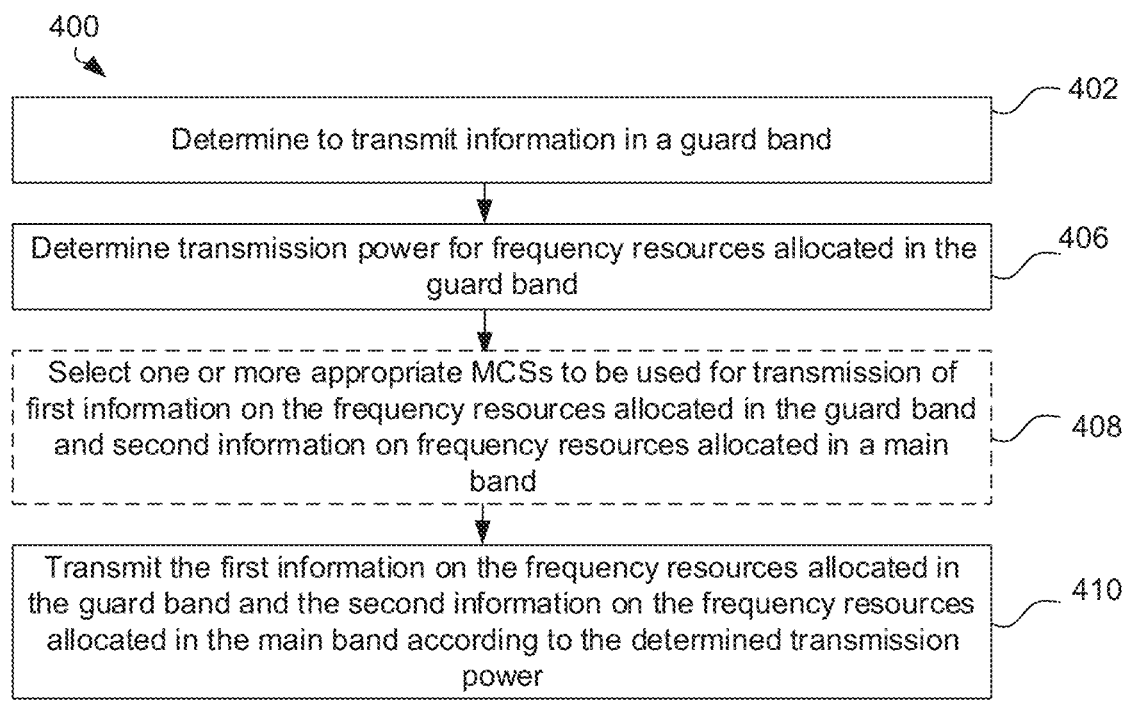
FIG. 4 is a flowchart illustrating example method steps according to some embodiments.

FIG. 4 is a flowchart illustrating example method steps of a method 400 performed by the transmitter node in the wireless communication network for communication of information in a communication channel. The communication channel comprises at least one main band having at least one adjacent guard band. Typically, each main band (if there are more than one) is flanked by guard bands. The main bands are used for transmission of information and the main bands may alternatively be known as information bands. The guard bands on each side of a main band may be used individually as a single band to carry any further information. Examples of available guard bands in Long Term Evolution, LTE systems include guard bands with 0.16 MHz on each side of a data band in a 1.4 MHz main band, and guard bands with 1 MHz on each side of a data band in a 20 MHz main band.

At step 402, the method 400 comprises determining whether to transmit information in the guard band based one or more configured transmission parameters associated with the transmitter node. The configured transmission parameters may comprise one or more of scheduled bandwidth of the communication channel, maximum configurable bandwidth of the communication channel, scheduling information of the frequency resources in the guard band, scheduling information of the frequency resources in the main band, configured transmit power, frequency band and spectral mask.

At step 406, the method 400 comprises determining transmission power for frequency resources allocated in the guard band. The transmission power for frequency resources allocated in the guard band may be determined based on the spectral mask defining a power density limit across an allocated frequency range of the communication channel.

For example, signals in the guard band may be defined by fixing the spectral mask. Hence, the signals may be formed such that it is ensured that the spectral envelope of the signals falls within the power density limit defined by the spectral mask.

Hence, in some embodiments, a power spectral density, PSD, which indicates an allowed power distribution for the frequency resources in the guard band may be determined. For example, the PSD refers to power distribution for signals over different frequencies in the guard band. For example, power may be reduced for a subset of the frequencies used over the communication channel.

In some examples, the transmitter node determines and sets the PSD of the signals in the guard band based on the power density limits prescribed by the spectral mask. The PSD is based upon maximum transmit power setting allowed for the signals in the guard band. It may, in some embodiments, be shaped linearly in dB in order to conform to the power density limits prescribed by the spectral mask.

The PSD set for the signals to be transmitted in the guard band should preferably not exceed the PSD imposed by the spectral mask since this may e.g. lead to increased risk of interference between channels.

Hence, in some embodiments, the transmitter node may set the PSD of the signals in the guard band such that it is always slightly below the PSD imposed by the spectral mask at any given frequency.

The set PSD of the signals of the guard band may e.g. differ from the PSD imposed by the spectral mask by an offset value $\varepsilon$, where $0<\varepsilon<1$.

Hence, the step 406 of determining the transmission power for the frequency resources allocated in the guard band may in some embodiments comprise setting a power spectral density, PSD, for the frequency resources in the guard band, wherein the PSD of the frequency resources in the guard band is a fraction of a value defined by the pre-determined spectral mask in the guard band and set below the spectral mask in the guard band.

Figure 5A:
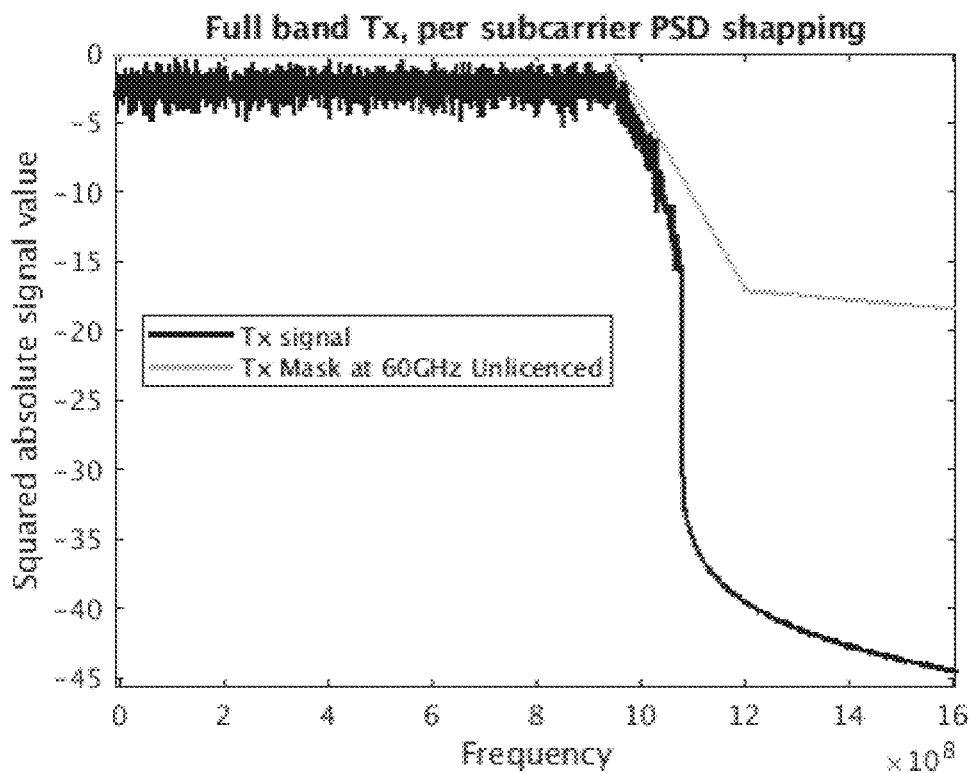
FIGS. 5A-5C are graphs illustrating power shaping of signals in a guard band according to some embodiments.
Figure 5B:
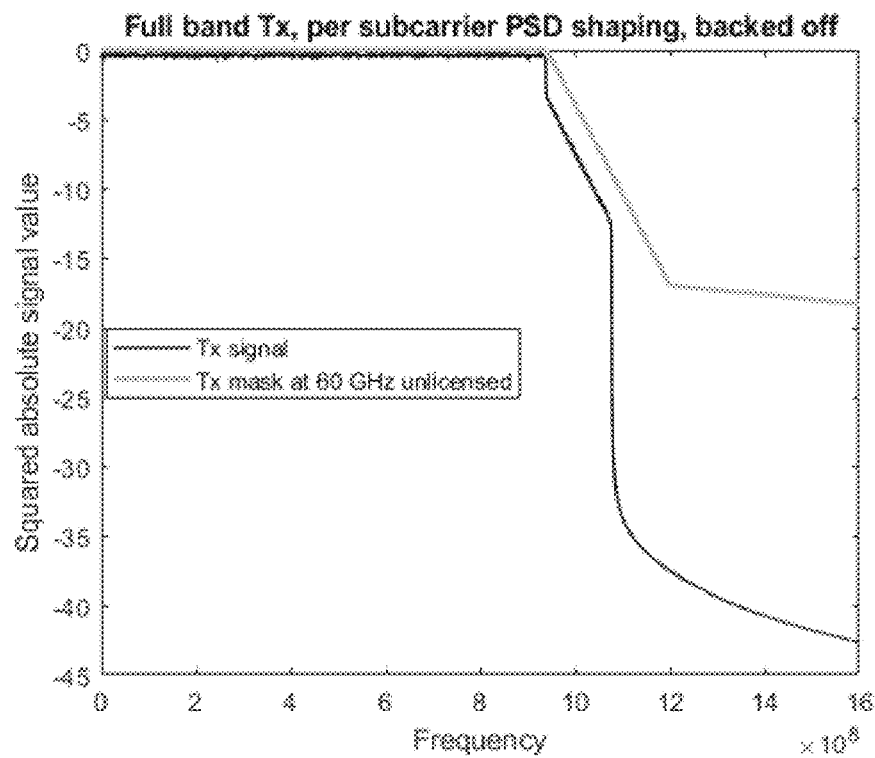
Figure 5C:
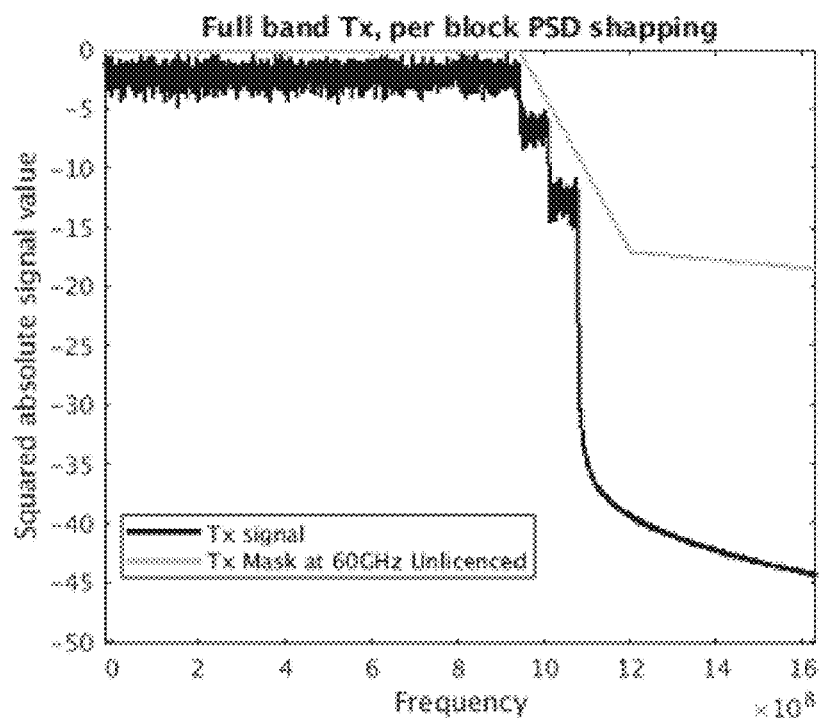

Therefore, the PSD of the signals at any frequency in the guard band is smaller than the PSD imposed by the spectral mask (which typically is a linear constraint as shown in any of FIGS. 5A-5C).

In some embodiments, the transmitter node may select the fractional offset value $\varepsilon$ to be higher than a highest value of an interference transmission spectrum estimate caused by RF impairments (e.g. power amplifier non-linearities), such that the sum of the PSD shaped spectrum and the interference spectrum is not larger than the spectral mask at any given frequency (see FIG. 5A).

In some embodiments, the PSD of the signals in the guard band is shaped linearly in frequency at the fractional offset value as shown in FIG. 5B. The fractional offset value which is less than the power density limit defined by the spectral mask is used for a spectrum shaping filter that may be applied for the purpose of controlling the out-of-band emissions.

In another embodiment, the guard band may be segmented into a plurality of sub-bands and the PSD in each sub-band may be determined such that the PSD in each sub-band is divided into flat frequency parts and is set below the spectral mask in the guard band (for example by an offset value as described above) as shown in FIG. 5C.

At step 410, the method comprises transmitting first information on the frequency resources allocated in the guard band and second information on frequency resources allocated in the main band to a receiver node according to the determined transmission power. For example, in some embodiments the first information and/or the second information may represent control information and user information.

In some embodiments, demodulation reference signals i.e., pilot signals may be allocated on the frequency resources in the guard band. Amplitude shaping of the guard band may be derived at the receiver node from channel estimates and in such case, there is no need to explicitly signal the amplitude shaping to the receiver node.

In some embodiments, the first information assigned on the frequency resources of the guard band is different from the second information assigned on the frequency resources of the main band. Additional data may e.g. be transmitted on the guard band, which hence increases spectrum utilization.

In some embodiments, the first information assigned on the frequency resources in the guard band is a repetition of a subset of the information assigned on the frequency resources in the main band. For example, the guard band may be used for sending redundant data. The redundant data may e.g. be a copy of at least a part of the data transmitted in the main band, which copied data may be repeated in the guard band according to a repetition pattern (as described below). An advantage with sending redundant data on the guard band is that it increases robustness of the transmissions, without affecting throughput measured in bits per second. Furthermore, the link's robustness may be increased by the repetitions, by lowering link error metrics such as block-error rates, CRC check failures, etc.

The pattern of which in-band subcarriers are repeated in the guard band, i.e. the repetition pattern, can potentially be any pattern but note that the repetition pattern (used by the transmitting node) typically should be known by the receiving node. Furthermore, a good practice is not to repeat the same data symbol on a guard band subcarrier which is significantly correlated with the subcarrier in which the original symbol was assigned to. In other words, the frequency distance of such subcarriers, i.e. the subcarrier associated with a given inband symbol and the guard band subcarrier that is associated with the same symbol, should be larger than the coherence bandwidth of the channel. One example of such allocation is as follow. Assuming that each guard band have 60 MHz worth of subcarriers for transmission of redundant symbols, then one example allocation would be to repeat the symbols transmitted in e.g. band [−0.94, −0.88] GHz in the guard band [0.94-1] GHz, and to repeat the symbols transmitted in the band [0.88, 0.94] GHz in the guard band [−1,−0.94,] GHz In some examples, first information on the frequency resources of the guard bands comprises data symbols which are the same as the data symbols that are assigned on the frequency resources in the main band.

Furthermore, when the first information comprises data which is (at least in part) the same as the data that are assigned on the frequency resources in the main band, the transmitter node may determine a repetition pattern which comprises a mapping between the repeated frequency resources in the guard band and the frequency resources in the main band. Further, the transmitter node may transmit an indication of the repetition pattern to the receiver node. Transmitting the indication of the repetition pattern to the receiver node may in some embodiments mean transmitting e.g. the mapping of the repetition pattern. The mapping of the repetition pattern may e.g. be visualised in a table.

Since the guard band in some embodiments may carry only redundant symbols, the receiving node does not necessarily need to know if the guard band is currently carrying redundant symbols or not—it typically only needs to know the repetition pattern. The receiving node can try to combine the in-band data with guard band according to the repetition pattern (used at the transmitter node) and verify if the block error rate (BLER) improves and/or that the cyclic redundancy check (CRC) passes. One advantage is that this results in reduced signaling from transmitting node to receiving node in terms of informing if the embodiment is currently being used or not.

Another advantage is that this type of operation is blind to the standard. That is, the receiving node typically only needs to do an extra effort and try to decode the data according to a second hypothesis, which takes into account the repetition pattern (compared to not using the guard band for redundant transmissions at all). As such, this (transmitter and receiver) technique may be very useful to be executed in connections where both ends of the link are provided by the same network vendor, possibly giving that vendor a competitive advantage. The receiver decoding approach to combine the inband and the edge band signals, is proprietary. But can be done, for example, according to a maximum-ratio combining (MRC) or minimum mean-squared error (MMSE) criterium.

In some embodiment, the method 400 comprises selecting one or more (appropriate) first modulation and coding schemes, MCSs, to be used for the transmission of the first information on the frequency resources allocated in the guard band and selecting one or more second MCSs to be used for transmission of the second information on the frequency resources allocated in the main band as illustrated in the optional step 308.

In some examples, based on a link quality estimate LQE, for the bandwidth allocation over the main band and guard band, the transmitting node may decide on the MCSs to be used for transmission of the information.

In some examples, the selected one or more first MCSs to be used for the transmission of the first information on the frequency resources in the guard band and selected one or more second MCSs for transmission of the second information on the frequency resources in the main band is identical (i.e. the same type of MCS is selected to encode both the first information and the second information).

For example, the first and second MCS is chosen such that the total throughput is maximized while the packet error rate/block error rate does not exceed some pre-set threshold. This is typically applicable for both single carrier and multi carrier systems.

In some examples, a selected one or more first MCSs to be used for the transmission of the first information on the frequency resources in the guard band is different from the selected one or more second MCSs to be used for the transmission of the second information on the frequency resources in the main band.

For example, if it is assumed that a multicarrier system is used, then one MCS may be chosen for transmission of the second information in the main band, and one or several other MCSs may be chosen for transmission of the first information in the guard band. For example, 64-quadrature amplitude modulation (QAM) can be used for subcarriers in the main band, and quadrature phase shift keying (QPSK) may be used for the subcarriers in the guard band.

In some embodiments, the transmitter node may transmit an indication about the one or more selected first MCSs used for the first information on the frequency resources in the guard band and selected one or more second MCSs used for the second information on the frequency resources in the main band to the receiver node.

In some examples, the transmitter node may transmit a mapping table comprising a mapping between the MCS used in the guard band and the MCS used in the main band to the receiver node. The mapping table may be transmitted as a downlink control information, DCI, to the receiver node.

An example mapping table comprising the mapping between the MCS used in the guard band and the MCS used in the main band is as shown in the below table 1.

TABLE 1

| Modulation index signaled in scheduling information | Main band | Guard band |
|---|---|---|
| 0 | 64-QAM | 16-QAM |
| 1 | 16-QAM | QPSK |
| 2 | QPSK | none (guard band not used for transmission) |

The indication of the selected MSC may be explicitly signalled as part of scheduling information to the receiver node. It could also be transmitted as a downlink or sidelink transmission. Scheduling information could in some embodiments be downlink or sidelink scheduling information.

Figure 6:
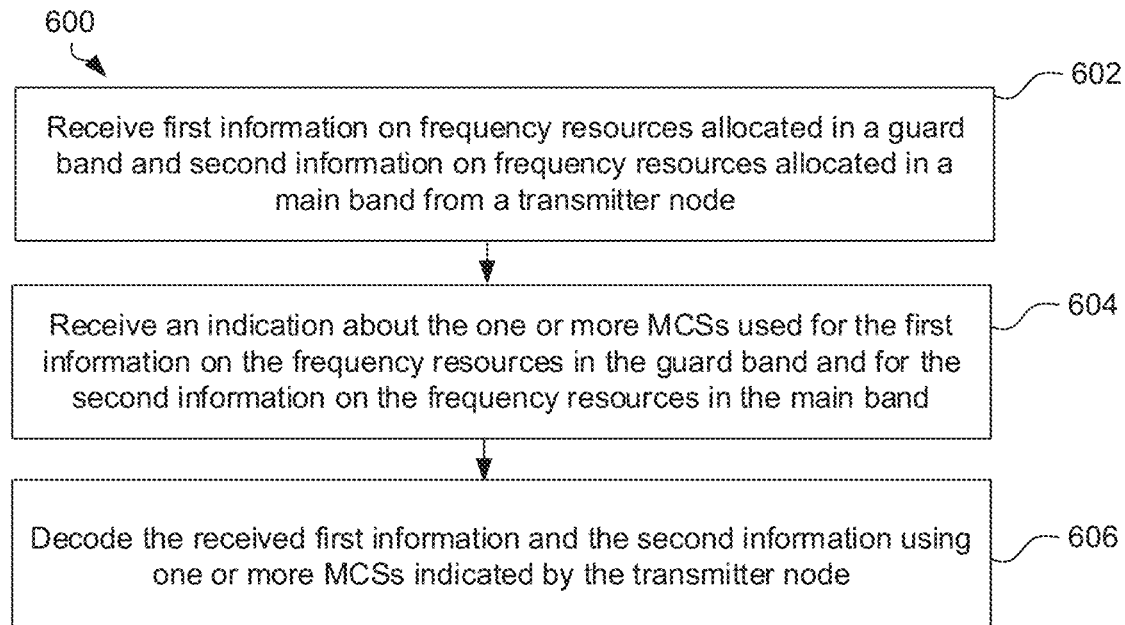
FIG. 6 is a flowchart illustrating example method steps according to some embodiments.

FIG. 6 is a flowchart illustrating example method steps of a method 600 performed by a receiver node in the wireless communication network for reception of information in a communication channel. As stated above, the receiver node may implement the method 600 for reception of information in the guard band of the communication channel. The received information may e.g. have been transmitted by a transmitter node utilizing the method 300 described above. The receiver node may receive control information and/or user information transmitted from the transmitter node. In some examples, demodulation reference signals i.e., pilot signals may be received in frequency resources in the guard band.

At step 602, the method 600 comprises receiving the first information on frequency resources allocated in the guard band and the second information on frequency resources allocated in the main band from the transmitter node.

In some examples, the first information assigned on the frequency resources of the guard band is different from the second information assigned on the frequency resources of the main band.

In some examples, the first information assigned on the frequency resources of the guard band is a repetition of a subset of the second information assigned on the frequency resources in the main band.

In some embodiments, when the first information is the same as at least a subset of the second information, the method 600 may further comprise receiving an indication of a repetition pattern defining a pattern comprising a mapping between the frequency resources in the guard band and the frequency resources in the main band, the information transmitted on the frequency resources in the main band being repeated at least in part on the frequency resources in the guard band At step 606, the method 600 comprises decoding the received first information and the second information using one or more selected first and second modulation and coding schemes, MCSs, indicated by the transmitter node.

In order to decode the received first information and the second information, the method 600 may at step 604, comprise receiving an indication about the one or more selected first MCSs used for transmitting the first information on the frequency resources in the guard band and the one or more selected second MCSs used for transmitting the second information on the frequency resources in the main band from the transmitter node.

In some embodiments, the receiver node may receive the indication in the form of a mapping table (e.g. the table 1 illustrated above) from the transmitter node. The mapping table may comprise a mapping between the MCS used in the guard band and the MCS used in the main band. Thus, the receiver node may decode the first information and the second information using the mapping table received from the transmitter node.

In some examples, the first information on the frequency resources in the guard band comprises data symbols which are the same as at least some of the data symbols that are assigned on the frequency resources in the main band. When the data symbols in the guard band are the same as the data symbols in the main band, the receiver node may receive an indication of a repetition pattern which defines how the information transmitted on the frequency resources in the main band is repeated on the frequency resources in the guard band. The receiver node decodes the data symbols assigned on the frequency resources in the guard band and the data symbols assigned on the frequency resources in the main band. Further, the receiver node combines the data symbols decoded in the guard band and the main band.

Figure 7:
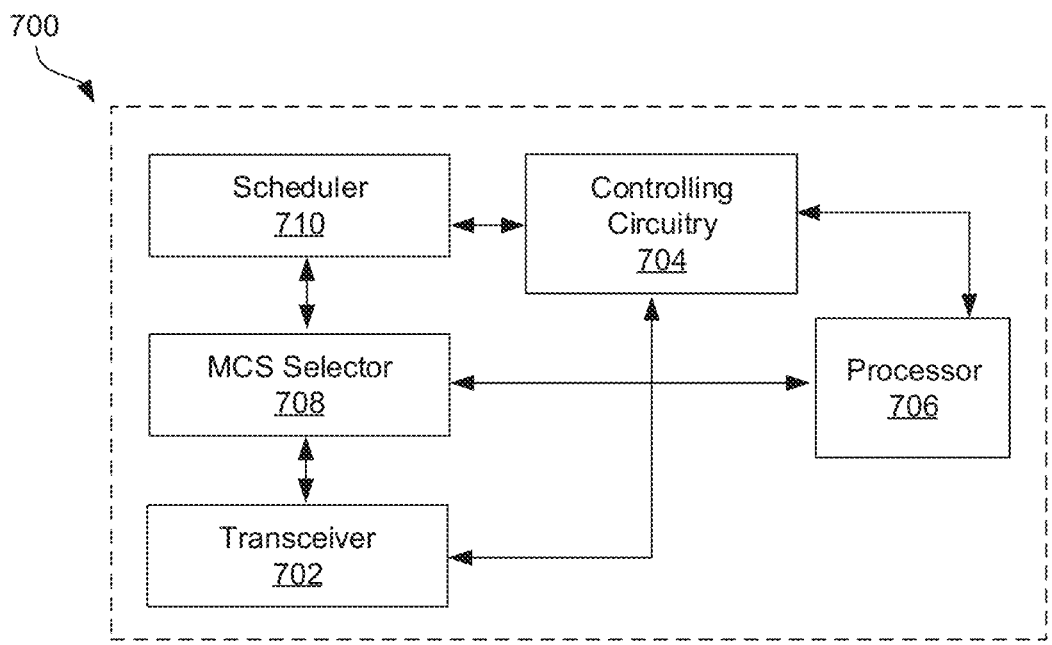
FIG. 7 is an example schematic diagram according to some embodiments.

FIG. 7 is an example schematic diagram showing an apparatus 700. The apparatus 700 may e.g. be comprised in a transmitter node (e.g. the transmitter node 102 described in conjunction with FIG. 2). The apparatus 700 is capable of transmitting the information in the communication channel and may be configured to cause performance of the method 400 for communication of information in the communication channel.

According to at least some embodiments of the present invention, the apparatus 700 in FIG. 7 comprises one or more modules. These modules may e.g. be a transceiver 702 a controlling circuitry 704, a processor 706, a MCS selector 708 and a scheduler 710. The controlling circuitry 704, may in some embodiments be adapted to control the above mentioned modules.

It can be mentioned that MCS selector 708 and the scheduler 710 may be merged into the processor 706, which may be called a data processor, potentially also covering the controlling circuitry 704.

The scheduler 710, the MCS selector 708 and the transceiver 702 as well as the controlling circuitry 704, may be operatively connected to each other.

The function of the MCS selector 708, when encompassed by the processor, may be performed by the processor 706.

Optionally, the scheduler 710 may be adapted to obtain one or more configured transmission parameters and to determine, based on the configured transmission parameters, whether to transmit information in the guard band. The transceiver 702 may be adapted to transmit the first information in the guard band and the second information in the main band to the receiver node according to the determined transmission power.

The MCS selector 708 may be adapted to select one or more MCSs to be used for transmitting the first information in the guard band and the second information in the main band.

As described above, the various ways of selecting one or more MCSs for the first information and the second information may be used, a few of which have been mentioned above in connection to the explanation of FIG. 4.

The transceiver 702 may be adapted to transmit the indication of the selected one or more MCSs for the first information in the guard band and the second information in the main band.

The controlling circuitry 704 may be adapted to control the steps as executed by the transmitter node 102. For example, the controlling circuitry 704 may be adapted to determine transmission power for the frequency resources allocated in the guard band based on the spectral mask. Thus, the controlling circuitry 704 may be adapted to control the transmit power of frequency resources such that the PSD of the signals in the guard band are within the power limit defined by the spectral mask (as described above in conjunction with the method 400 and FIG. 2.

In addition, the transceiver 702 is also adapted to transmit a mapping table as a downlink control information, DCI, under the control of the controlling circuitry 704, to the receiver node.

Figure 8:
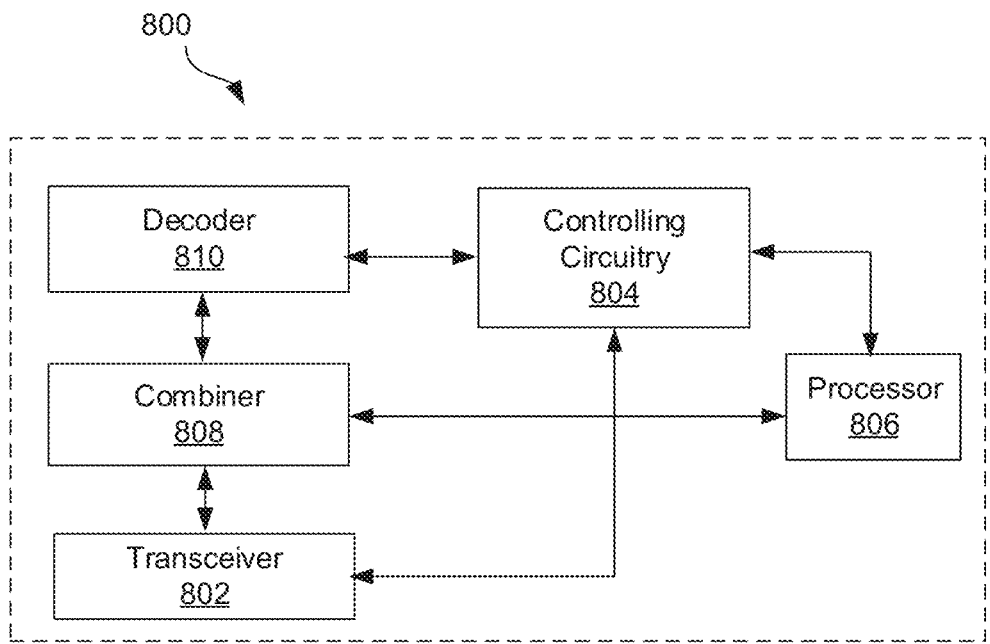
FIG. 8 is an example schematic diagram according to some embodiments.

FIG. 8 is an example schematic diagram showing an apparatus 800. The apparatus 800 may e.g. be comprised in a receiver node (e.g. the receiver node 104 described in conjunction with FIG. 2). The apparatus 800 is capable of receiving the information in the guard band from the apparatus 700.

The apparatus 800 may be adapted to perform the method 500 for reception of information in the guard band.

According to at least some embodiments of the present disclosure, the apparatus 800 as illustrated in FIG. 8 may comprise one or more modules. These modules may e.g. be a transceiver 802, a controlling circuitry 804, a processor 806, a combiner 808 and a decoder 810. The controlling circuitry 804 may be adapted to control said modules.

The transceiver 802 may be adapted to receive the first information on frequency resources allocated in the guard band and second information on frequency resources allocated in the main band.

The processor 806 which may be considered as a data processing module, may in some embodiments be comprised in or form part of the controlling circuitry 804 and may be adapted to execute one or more instructions.

The transceiver 802 may be adapted to receive an indication about the one or more MCSs used for the first information on the frequency resources in the guard band and for the second information on the frequency resources in the main band from the transmitter node.

The decoder 810 may be adapted to decode the received first information and the second information using one or more modulation and coding schemes, MCSs, indicated by the transmitter node. The transceiver 802 may be operatively connected to each other enabling the function of each of the modules.

After decoding first information assigned on the frequency resources in the guard band and second information assigned on the frequency resources in the main band by the decoder 810, the combiner 808 may be adapted for combining the first and second information decoded in the guard band and the main band.

Figure 9:
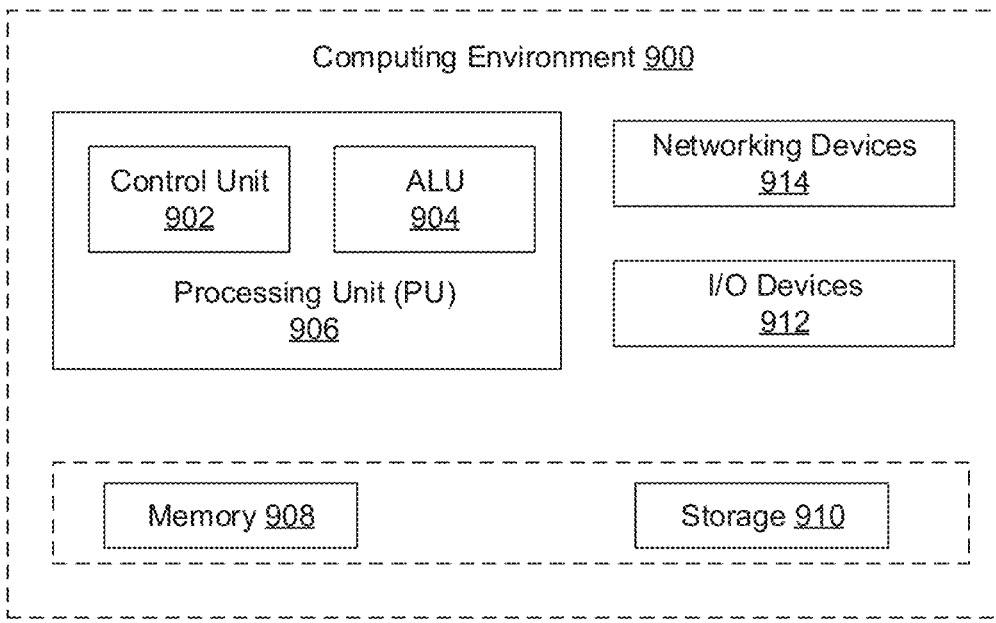
FIG. 9 discloses an example computing environment according to some embodiments.

FIG. 9 illustrates an example computing environment 900 implementing a method and the transmitter node and the receiver node for communication of information in a guard band of a communication channel as described in FIG. 4 and FIG. 6. As depicted in FIG. 9, the computing environment 900 comprises at least one data processing module 906 that is equipped with a control module 902 and an Arithmetic Logic Unit (ALU) 904, a memory 908, a storage 910, a plurality of networking devices 914 and a plurality Input output, I/O devices 912. The data processing module 906 may be responsible for implementing the method described in FIG. 4 and FIG. 6. For example, the data processing module 906 may in some embodiments be equivalent to the processor of the transmitter node and receiver node described above in conjunction with the FIGS. 2-8. The data processing module 906 is capable of executing software instructions stored in memory 908. The data processing module 906 receives commands from the control module 902 in order to perform its processing. Further, any logical and arithmetic operations involved in the execution of the instructions are computed with the help of the ALU 904.

The computer program is loadable into the data processing module 906, which may, for example, be comprised in an electronic apparatus (such as a UE or a network node). When loaded into the data processing module 906, the computer program may be stored in the memory 908 associated with or comprised in the data processing module 906. According to some embodiments, the computer program may, when loaded into and run by the data processing module 906, cause execution of method steps according to, for example, any of the methods illustrated in FIGS. 4 and 6 or otherwise described herein.

The overall computing environment 900 may be composed of multiple homogeneous and/or heterogeneous cores, multiple CPUs of different kinds, special media and other accelerators. Further, the plurality of data processing modules 906 may be located on a single chip or over multiple chips.

The algorithm comprising of instructions and codes required for the implementation are stored in either the memory 908 or the storage 910 or both. At the time of execution, the instructions may be fetched from the corresponding memory 908 and/or storage 910, and executed by the data processing module 906.

In case of any hardware implementations various networking devices 908 or external I/O devices 910 may be connected to the computing environment to support the implementation through the networking devices 908 and the I/O devices 910.

The embodiments disclosed herein can be implemented through at least one software program running on at least one hardware device and performing network management functions to control the elements. The elements shown in FIG. 9 include blocks which can be at least one of a hardware device, or a combination of hardware device and software module.

Figure 10:
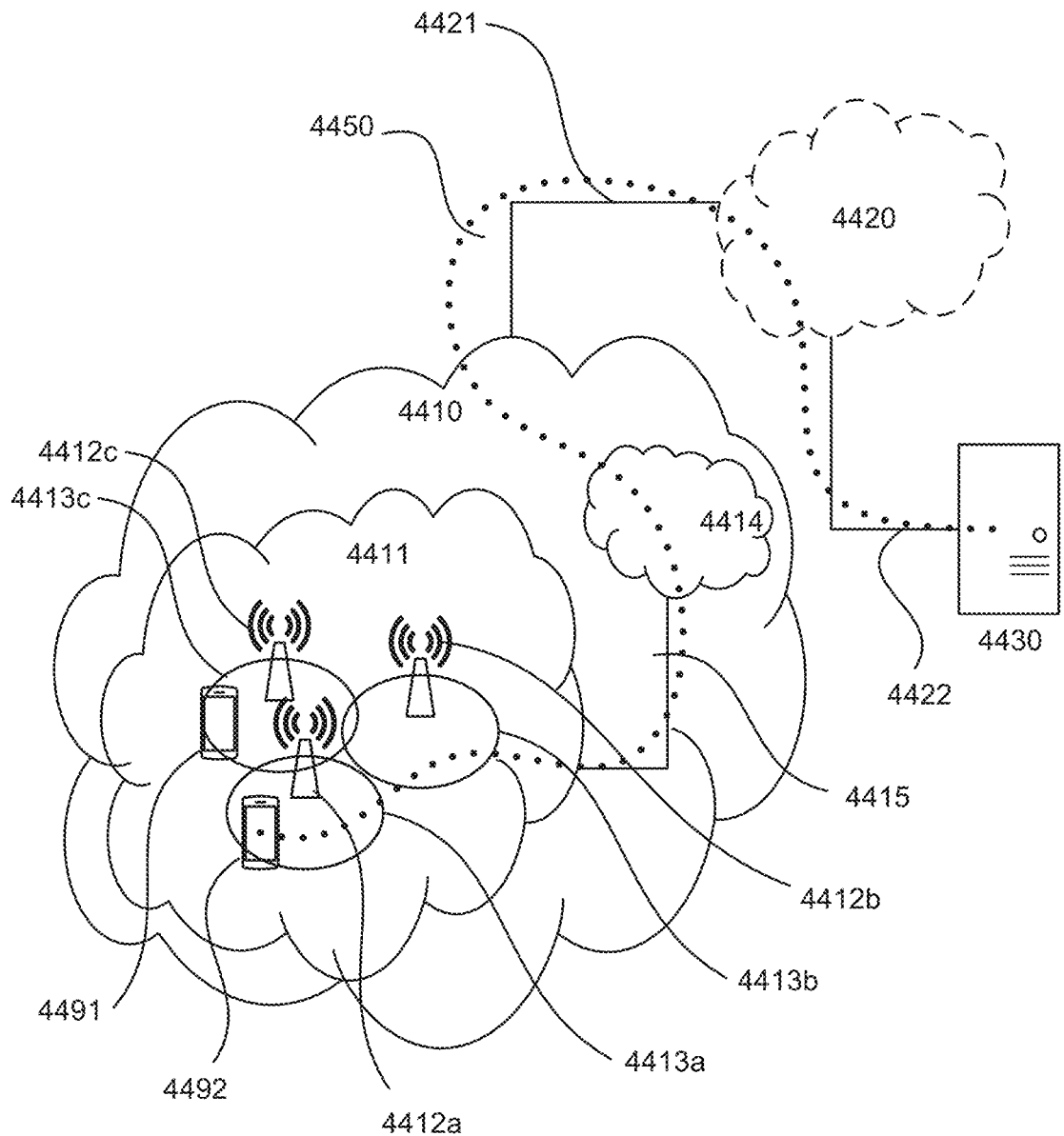
FIG. 10 is a block diagram of a telecommunication network connected via an intermediate network to a host computer, according to some embodiments.

FIG. 10 is a block diagram of a telecommunication network connected via an intermediate network to a host computer according to some embodiments. With reference to FIG. 10, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 10 as a whole enables connectivity between the connected UEs 4491, 4492 and host computer 4430. The connectivity may be described as an over-the-top, OTT connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 11:
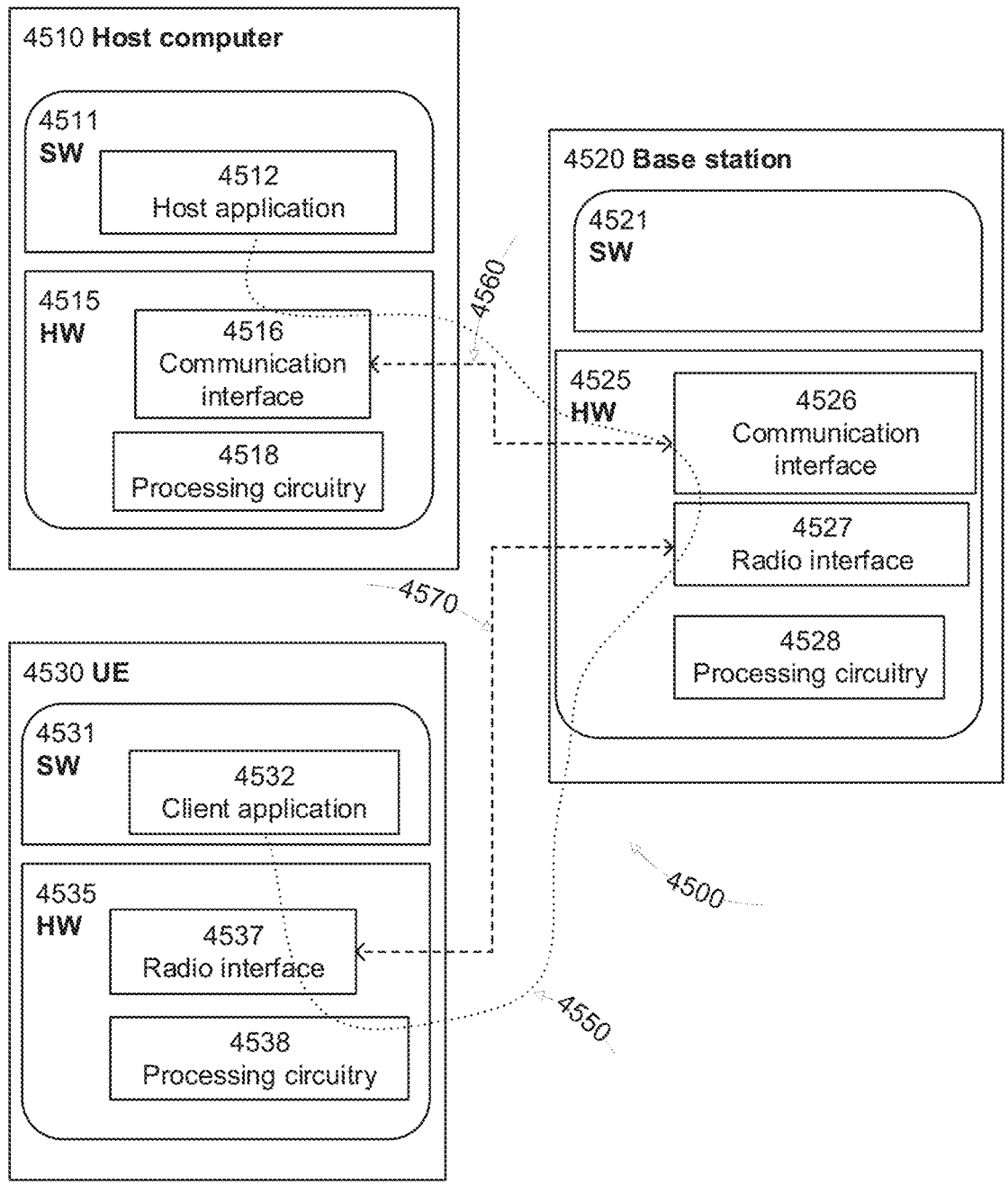
FIG. 11 is a block diagram of a host computer communicating via a base station with a UE over a partially wireless connection, according to some embodiments.

FIG. 11 is a block diagram of a host computer communicating via a base station with a user equipment over a partially wireless connection. Example implementations, in accordance with an embodiment, of the UE, base station and host computer discussed in the preceding paragraphs will now be described with reference to FIG. 11. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities.

In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 10) served by base station 4520. Communication interface 4526 may be configured to facilitate connection 4560 to host computer 4510. Connection 4560 may be direct or it may pass through a core network (not shown in FIG. 11) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 14 may be similar or identical to host computer 4430, one of base stations 4412a, 4412b, 4412c and one of UEs 4491, 4492 respectively. This is to say, the inner workings of these entities may be as shown in FIG. 15 and independently, the surrounding network topology may be that of FIG. 10.

In FIG. 11, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors or the like.

Figure 12:
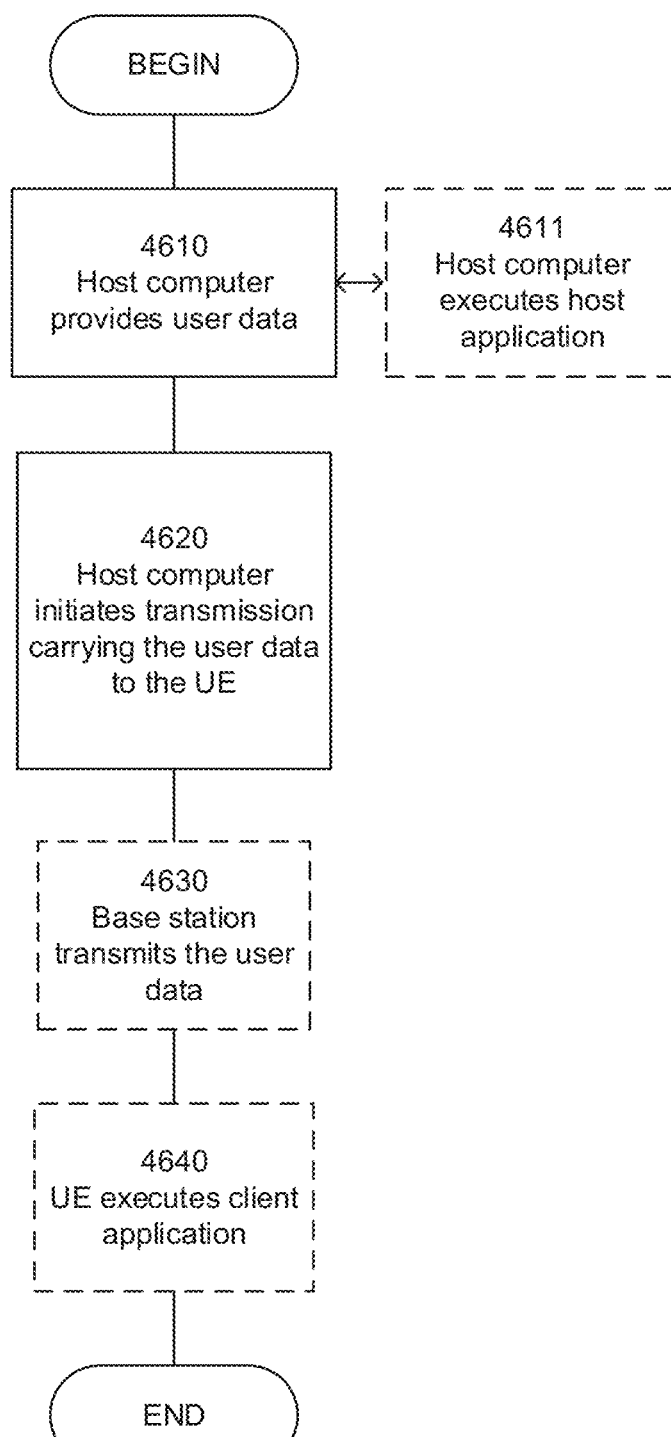
FIG. 12 is a block diagram of methods implemented in a communication system including a host computer, a base station, and a UE, according to some embodiments.

FIG. 12 is a block diagram of methods implemented in a communication system including a host computer, a base station, and a user equipment according to some embodiments. For simplicity of the present disclosure, only drawing references to FIG. 12 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 13:
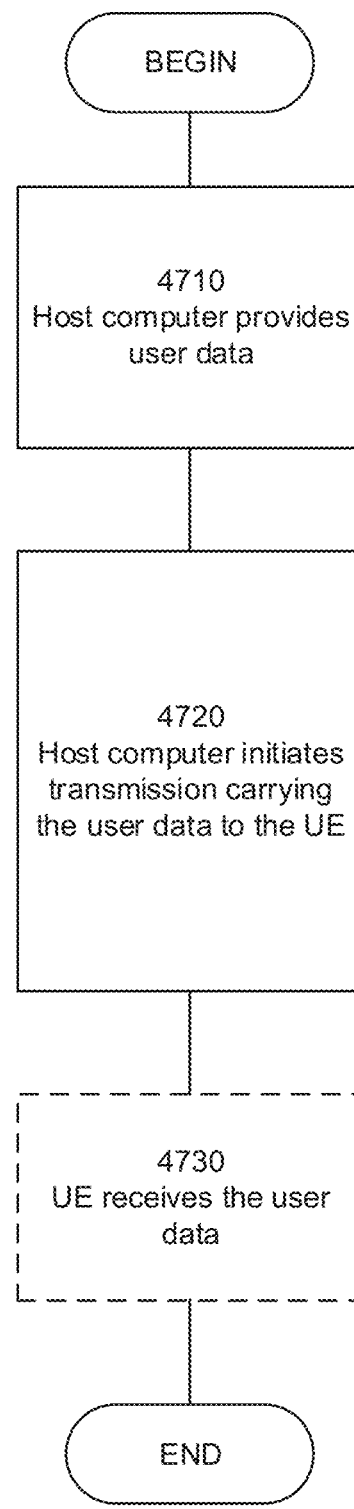
FIG. 13 is a block diagram of methods implemented in a communication system including a host computer, a base station, and a UE, according to some embodiments.

FIG. 13 is a block diagram of methods implemented in a communication system including a host computer, a base station, and a user equipment according to some embodiments. For simplicity of the present disclosure, only drawing references to FIG. 13 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 14 is a block diagram of methods implemented in a communication system including a host computer, a base station, and a user equipment according to some embodiments. For simplicity of the present disclosure, only drawing references to FIG. 14 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 15 is a block diagram of methods implemented in a communication system including a host computer, a base station, and a user equipment according to some embodiments. FIG. 15 is a flowchart illustrating a method implemented in a communication system, in accordance with one embodiment. The communication system includes a host computer, a base station and a UE. For simplicity of the present disclosure, only drawing references to FIG. 15 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

What is claimed is:

1. A method for communication of information in a communication channel, wherein the communication channel comprises at least one main band and an adjacent guard band, the method performed by a transmitter node, in a wireless communication network, wherein the method comprises:

determining whether to transmit information in the guard band, based on one or more configured transmission parameters associated with the transmitter node;

upon the determination to transmit information in the guard band, determining transmission power for frequency resources in the guard band based on a spectral mask defining a power density limit for frequencies in the guard band, by setting a power spectral density (PSD) for the frequency resources in the guard band below the spectral mask in the guard band; and transmitting, to a receiver node, first information on the frequency resources in the guard band according to the determined transmission power, and transmitting second information on frequency resources allocated in the main band.

2. The method according to claim 1, further comprising:
selecting one or more first modulation and coding schemes (MCSs) to be used for transmission of the first information in the guard band; and
selecting one or more second MCSs to be used for transmission of the second information in the main band.

3. The method according to claim 1, wherein a selected first MCS to be used for the transmission of the first information is identical to a selected second MCS to be used for the transmission of the second information.

4. The method according to claim 1, wherein a selected first MCS to be used for the transmission of the first information is different than a selected second MCS to be used for the transmission of the second information.

5. The method according to claim 1, further comprising: transmitting, to the receiver node, an indication of the selected one or more first MCSs and the selected one or more second MCSs.

6. The method according to claim 5, wherein transmitting the indication comprises transmitting, to the receiver node, a MCS mapping table comprising a mapping between the selected one or more first MCSs to the selected one or more second MCSs.

7. The method according to claim 1, wherein the one or more configured transmission parameters comprise a scheduled bandwidth of the communication channel, a maximum configurable bandwidth of the communication channel, and the spectral mask, and wherein the step of determining to transmit information in the guard band is based on the maximum configurable bandwidth, the scheduled bandwidth of the communication channel, and the spectral mask.

8. The method according to claim 1, wherein the step of determining transmission power for the frequency resources in the guard comprises:
segmenting the guard band into a plurality of sub-bands; and
determining a PSD in each sub-band, wherein the PSD in each sub-band is set below the portion of the spectral mask corresponding with the sub-band.

9. The method according to claim 1, wherein the first information is different than the second information.

10. The method according to claim 1, wherein the first information is a repetition of a subset of the second information.

11. The method according to claim 10, further comprising:
determining a repetition pattern defining a pattern comprising a mapping between the frequency resources in the guard band and the frequency resources in the main band, the second information transmitted on the frequency resources in the main band being repeated at least in part on the frequency resources in the guard band, as said first information; and
transmitting an indication of the repetition pattern to the receiver node.

12. The method according to claim 1, wherein the first information and the second information represent one or more of: control information and user information.

13. A transmitter node configured to operate in a wireless communication network for communication of information in a communication channel, wherein the communication channel comprises at least one main band and an adjacent guard band, the transmitter node comprising:
a transceiver; and
a processor configured to:
determine whether to transmit information in the guard band, based on one or more configured transmission parameters associated with the transmitter node;
upon the determination to transmit information in the guard band, determine transmission power for frequency resources in the guard band by setting a power spectral density (PSD) for the frequency resources in the guard band below a spectral mask that defines a power density limit for the frequencies in the guard band; and
use the transceiver to transmit first information for a receiver node on the frequency resources in the guard band according to the determined transmission power, and transmit second information for the receiver node on frequency resources allocated in the main band.

14. The transmitter node according to claim 13, wherein the processor is configured to:
select one or more first modulation and coding schemes (MCSs) to be used for transmission of the first information; and
select one or more second MCS to be used for transmission of the second information.

15. The transmitter node according to claim 13, wherein a selected first MCS to be used for the transmission of the first information is identical to a selected second MCS to be used for the transmission of the second information.

16. The transmitter node according to claim 13, wherein a selected first MCS to be used for the transmission of the first information is different from a selected second MCS to be used for the transmission of the second information.

17. The transmitter node according to claim 13, wherein the processor is further configured to use the transceiver to transmit, for the receiver node, an indication of the selected one or more first MCSs and the selected one or more second MCSs.

18. The transmitter node according to claim 17, wherein the indication is a MCS mapping table comprising a mapping between the selected one or more first MCS used for transmissions in the guard band to the selected one or more second MCS used for transmissions in the main band.

19. The transmitter node according to claim 13, wherein the one or more configured transmission parameters comprise a scheduled bandwidth of the communication channel, a maximum configurable bandwidth of the communication channel, and the spectral mask.

20. The transmitter node according to claim 13, wherein the processor is configured to determine transmission power for the resources in the guard based on:
segmenting the guard band into a plurality of sub-bands; and
determining a PSD in each sub-band, wherein the PSD in each sub-band is set below a corresponding portion of the spectral mask.

21. The transmitter node according to claim 13, wherein the first information is different than the second information.

22. The transmitter node according to claim 13, wherein the first is a repetition of a subset of the second information.

23. The transmitter node according to claim 22, wherein the processor is configured to determine a repetition pattern defining a pattern comprising a mapping between the frequency resources in the guard band and the frequency resources in the main band, such that the first information comprises repetition of the second information according to the repetition pattern, and wherein the processor is configured to transmit, via the transceiver, an indication of the repetition pattern to the receiver node.

24. The transmitter node according to claim 13, wherein the first information and the second information represent one or more of: control information and user information.

25. A method of operation by a transmitter node in a wireless communication network, the method comprising, with respect to using a communication channel having a main band separated from another channel by a guard band:
    determining whether to use the guard band for transmitting information to a receiver, in addition to using the main band for transmitting information to the receiver; and
    responsive to determining to use the guard band:
        determining guard-band transmit power by setting a power spectral density for frequency resources contained in the guard band to below a spectral mask that defines power limits for out-of-band emissions when transmitting information in the main band of the communication channel; and
        transmitting first information in the guard band according to the determined transmit power, concurrent with transmitting second information in the main band.

26. The method according to claim 25, wherein the first information comprises a repetition of all or a portion of the second information.

27. The method according to claim 25, further comprising determining modulation and coding for transmission of the first information according to the guard-band transmit power, and determining modulation and coding for transmission of the second information according to a main-band transmission power determined for transmission of the second information.

* * * * *